SAMUEL ROCKAFELLOW.
Improvement in Wheel-Cultivators.
No. 126,092.             Patented April 23, 1872.
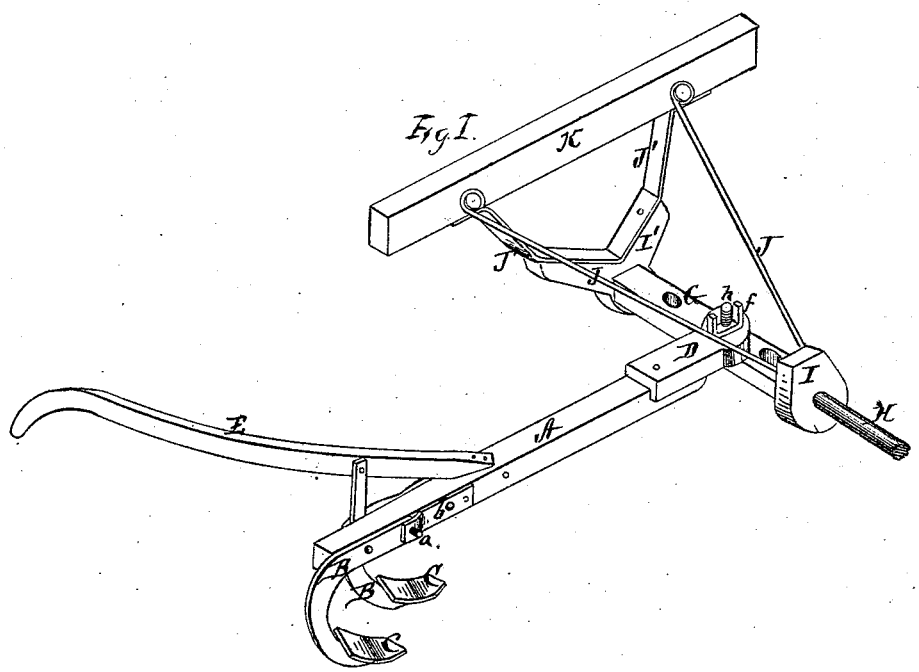
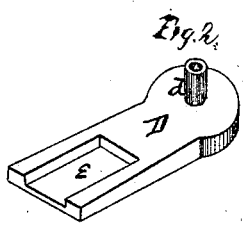

126,092

UNITED STATES PATENT OFFICE.

SAMUEL ROCKAFELLOW, OF MOLINE, ILLINOIS, ASSIGNOR TO HIMSELF, HEMAN A. BARNARD, AND J. SILAS LEAS, OF SAME PLACE.

IMPROVEMENT IN WHEEL-CULTIVATORS.

Specification forming part of Letters Patent No. 126,092, dated April 23, 1872.

*To all whom it may concern:*

Be it known that I, SAMUEL ROCKAFELLOW, of Moline, in the county of Rock Island and in the State of Illinois, have invented certain new and useful Improvements in Cultivator; and do hereby declare that the following is a full, clear, and exact description thereof, reference being had to the accompanying drawing and to the letters of reference marked thereon making a part of this specification.

The nature of my invention consists in the construction and arrangement of a cultivator, as will be hereinafter more fully set forth.

In order to enable others skilled in the art to which my invention appertains to make and use the same, I will now proceed to describe its construction and operation, referring to the annexed drawing, in which—

Figure 1 is a perspective view, showing one side of my cultivator; and Fig. 2 is a perspective view of the coupling connecting the beam with the spindle.

In the drawing I have not deemed it necessary to represent more than one side of my cultivator, as that fully illustrates all that I claim as my invention.

A represents a wooden beam of any desired dimensions, to each side of which is pivoted a metal shank, B, having a shovel or plow, C, attached at its lower end. These shanks are arranged one in front of the other on opposite sides of the beam, and their upper or front ends run parallel with the wooden beam. The extreme front end of each shank passes in under a guide, $b$, attached to the wooden beam, and a wooden pin, $a$, passes through said guide and shank, and into the beam, thus holding the shank with its plow or shovel in proper position for work; but should the shovel strike any obstacle the wooden pin will break, and thus save all other parts of the cultivator from breaking.

Heretofore, in cultivators of this class, the beam and shank have been made in one piece and of iron; but by making, as in this case, the main part of the beam of wood, and only the continuations or shanks of iron, I am enabled to make the beam of greater length without additional weight.

To the beam A the handle E is firmly secured in any convenient manner. D represents the casting forming the coupling for the beam A. This coupling is on its under side, at the rear end, provided with a recess, $e$, fitting over the front end of the beam, and firmly secured to the same. From the under side of the front end of the coupling D projects a tube, $d$, which is inserted from the upper side in a hole in the spindle G. A bolt, $f$, is then passed upward through said tube and fastened by a thumb-nut, $h$, thus completing the coupling of the beam A to the axle G, allowing the beam to be turned from side to side. The axle G is flat, as shown, having several holes, so that the beam may be moved out or in on the same, as occasion may require. The tube $d$ on the casting D is of equal length with the thickness of the flat axle G, and is made to neatly fit into the perforations made in the axle. By means of this connection the strain is prevented on the bolt, and the wear of the bolt and axle is greatly relieved, and the beams allowed, at all times, to freely move from side to side.

In this class of cultivators the entire strain of the beams, which is very great, is on the bolts upon which they turn, and oftentimes the bolts become bent or broken, and prevent the free shifting of the plows as required. By my invention, as described, the difficulties heretofore experienced are greatly, if not entirely, overcome.

On the outer end of the axle G is formed the spindle H, which passes through a block or bearing, I, and is to have a wheel placed upon its outer end. The inner end of the axle G is also provided with a short spindle or journal passing through the block or bearing I', which is braced to the beam K by braces J', the block I being also connected with said beam by braces J. By this means it will be seen that the plows may be raised up out of the ground by the axle turning in its bearings. Both sides of the cultivator being constructed alike, the beams K are suitably connected and provided with means for attaching the team.

Having thus fully described my invention, what I claim as new, and desire to secure by Letters Patent, is—

The single coupling D, having the recess E and hollow tube $d$, used in connection with the beam A, and clamped to the pivoted axle G by the bolt and nut $h\ f$, all as and for the purposes set forth.

In testimony that I claim the foregoing I have hereunto set my hand this 11th day of December, 1871.

SAMUEL ROCKAFELLOW.

Witnesses:
J. SILAS LEAS,
ELSWORTH MAPES.